A. H. KELDAY.
SIGNALING APPARATUS FOR USE ON ROAD VEHICLES.
APPLICATION FILED DEC. 18, 1917.

1,397,639.

Patented Nov. 22, 1921.

Inventor
A. H. Kelday.
by
W. P. Evans
Attorney.

UNITED STATES PATENT OFFICE.

ARTHUR HAROLD KELDAY, OF LONDON, ENGLAND.

SIGNALING APPARATUS FOR USE ON ROAD-VEHICLES.

1,397,639.     Specification of Letters Patent.     Patented Nov. 22, 1921.

Application filed December 18, 1917. Serial No. 207,671.

*To all whom it may concern:*

Be it known that I, ARTHUR HAROLD KELDAY, a subject of the King of Great Britain and Ireland, residing at 8 Bampton road, Forest Hill, London, S. E., England, have invented certain new and useful Improvements Relating to Signaling Apparatus for Use on Road-Vehicles, of which the following is a specification.

This invention relates to signaling apparatus for use on road vehicles and has for its object to provide simple and convenient means to indicate the intended movement, and the direction of the intended movement to the right or left of the driver of a vehicle as a warning to the drivers of following vehicles.

According to the invention I utilize the red tail light or a special red or other light which, when the driver intends to move to the right or to the left, is caused momentarily to be intercepted or flickered and by other means at the same time I give an indication, as for example by the exposure or illumination of an arrow, as to the direction of movement. For example, on each side of the red tail light or special light, apertures are provided in the casing of the lamp in the form of arrows directed to the right and left respectively, the one may be colored green and the other red or both may be colored red or white, and means may be provided by which on the red light being flickered one or other of the arrows is illuminated or exposed in order to indicate the direction of intended movement.

It will be understood that each shutter device is operable from the driver's seat for example by hand operating levers disposed in juxta-position so that one or other may be conveniently selected for operation.

The invention comprises the construction of apparatus as hereinafter described.

The invention is illustrated in the accompanying drawings in which—

Figure 1:
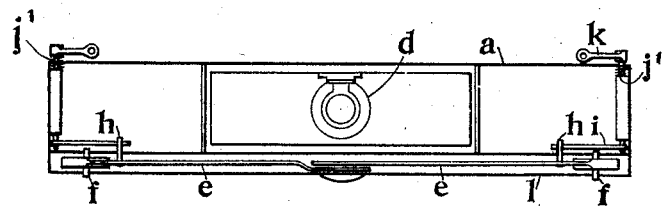
Figure 1 is a sectional plan of a signaling apparatus which is applied to the casing bearing the number plate of the vehicle.
Figure 2:
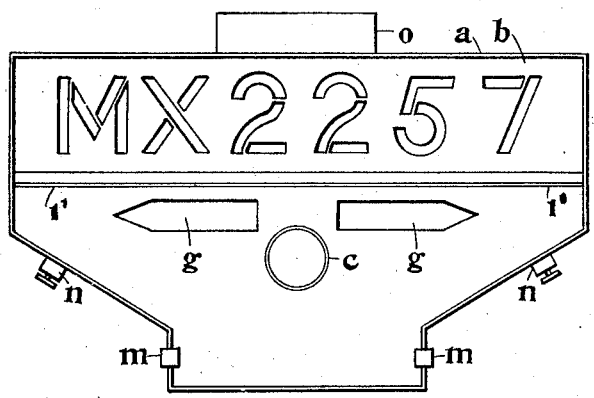
Fig. 2 is a front elevation corresponding to Fig. 1.
Figure 3:
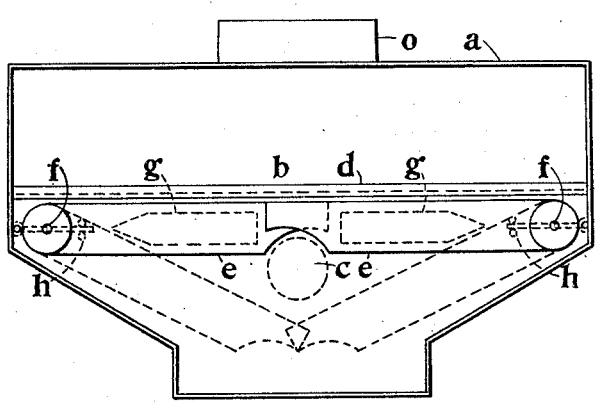
Fig. 3 is a front elevation with the front part of the casing removed.

In carrying the invention into effect as illustrated in the accompanying drawings, I provide the casing *a* usually employed for the number plate *b* at the same time to carry the red colored tail light *c*. This red light *c* is advantageously provided immediately beneath the illuminated number plate *b* and the same source of light, that is the lamp *d* may be used for the number plate as well as for the red colored lens. Within the casing *a* of the lamp adjacent to the red-colored lens I provide a pair of shutters *e*. These are mounted at the opposite ends upon pins *f* and they are operated by Bowden mechanism or other means of transmission from the driver's seat, and by such means as a spring they are maintained in the upper position in which the arrow apertures *g* are closed by them as indicated in Fig. 3. In the illustrated construction two juxtaposed pins *h* are mounted at the rear of the respective shutters in a position near the pivoting pins *f* and between these pins *h* an operating arm *i* is mounted upon a rearwardly extending spindle *j* carried on the inner face of the side wall of the casing *a*. The rearwardly extending end of the spindle *j* has mounted upon it a lever *k* which is operable by Bowden transmission wire from the driver's seat and conveniently a spiral spring $j^1$ may be mounted upon the spindle *j*, one end being secured to the spindle and the other to the boss through which the spindle passes or to the side wall of the casing so that thus the arms *i* are normally directed upwardly and thus when the Bowden transmission wire is not operated the shutters *e* assume their uppermost position. The ends of the shutters *e* are extended and their ends diverted one from the other so that thus in the operation of the shutters the light passing through the red tail lens *c* may flicker so that the flickering of the red light may itself serve as a signal of intended movement.

It will be understood that the rear or red light need never entirely be obscured and that the flickering effect may be produced entirely by the operation of the shutters or by contraction of the area through which the light is passed.

In the illustrated construction the lower front part *l* of the casing is adapted to be hinged at $l^1$ and clips *m* may be provided for engaging the lower end. Brackets *n* may be provided by means of which the lamp may be secured in position upon arms or brackets provided upon the car. *o* indicates a ventilating hood.

For use in the day-time the shutters may be provided with a white or other colored surface for the purpose of attracting attention.

Within the lamp casing *a* reflecting mirrors may be provided with a view to securing effective diffusion of light through the apertures.

The invention is not confined to the utilization of a single casing as described, for if required a special lamp casing may be provided for the purpose of the invention. Similarly, the invention is not confined to the particular means employed for producing the flickering effect of the light.

I claim:

1. A signaling device for use on road vehicles, comprising a casing, an aperture in the said casing at which a signal light is constantly exposed, two signal arms adapted to indicate direction and inclosed and mounted in the said casing in such position as to intercept the signal light on their moving into the "on" position, and independent means for moving the respective signal arms from the "off" to the "on" position, substantially as described.

2. A signaling device for use on road vehicles, comprising a casing, an aperture in the said casing at which a signal light is constantly exposed, two apertures in the said casing of a shape indicating direction and disposed on each side of the aperture first referred to, two signal arms adapted respectively to close one or other of the said two apertures and to intercept the signal light on the movement of one or other of the signal arms from the "off" to the "on" position, and independent means for moving the signal arms from the "off" to the "on" position, substantially as described.

ARTHUR HAROLD KELDAY.